United States Patent [19]
Desurvire et al.

[11] Patent Number: 5,903,368
[45] Date of Patent: May 11, 1999

[54] METHOD AND A SYSTEM FOR OPTICAL COMMUNICATIONS WITH PASSIVE ROUTING

[75] Inventors: Emmanuel Desurvire, Bruyeres le Chatel; José Chesnoy, Paris, both of France

[73] Assignee: Alcatel Alsthom Compagnie Generale d'Electricite, Paris, France

[21] Appl. No.: 08/784,518

[22] Filed: Jan. 17, 1997

[30] Foreign Application Priority Data

Jan. 18, 1996 [FR] France .................................. 96 00535

[51] Int. Cl.⁶ ...................................................... H04J 14/00
[52] U.S. Cl. .......................... 359/115; 359/138; 359/139; 359/165; 359/173
[58] Field of Search ................................. 359/115, 117, 359/173, 128, 139, 165, 138

[56] References Cited

U.S. PATENT DOCUMENTS

| | | | |
|---|---|---|---|
| 4,065,644 | 12/1977 | Shinosky, Jr. ............................ | 315/372 |
| 5,483,340 | 1/1996 | Webb et al. ............................. | 356/345 |
| 5,506,713 | 4/1996 | Okamoto et al. ........................ | 359/165 |
| 5,715,345 | 2/1998 | McKinley ................................ | 385/115 |
| 5,748,351 | 5/1998 | Morimoto ................................ | 359/193 |

FOREIGN PATENT DOCUMENTS

0566464A1  10/1993  European Pat. Off. .

OTHER PUBLICATIONS

Aubin et al, "Record amplifier span of 105 km in a soliton transmission experiment at 10 Gbit/s over 1 Mm", *Electronics Letters*, vol. 31, No. 3, Feb. 2, 1995, Stevenage, GB, pp. 217–219.

Shimada et al, "Very high–speed optical signal processing", *Proceedings of the IEEE*, vol. 81, No. 11, Nov. 1993, New York, pp. 1633–1646.

Midrio et al, "Polarisation–multilevel soliton transmission", *Electronics Letters*, vol. 31, No. 17, Aug. 17, 1995, Stevenage, GB, pp. 1473–1475.

*Primary Examiner*—Leslie Pascal
*Attorney, Agent, or Firm*—Sughrue, Mion, Zinn, Macpeak & Seas, PLLC

[57] ABSTRACT

Optical pulses carrying information to be conveyed are routed, for each pulse, by the intensity of the pulse. The pulses may be solitons. The invention is particularly applicable to long distance communications.

11 Claims, 1 Drawing Sheet

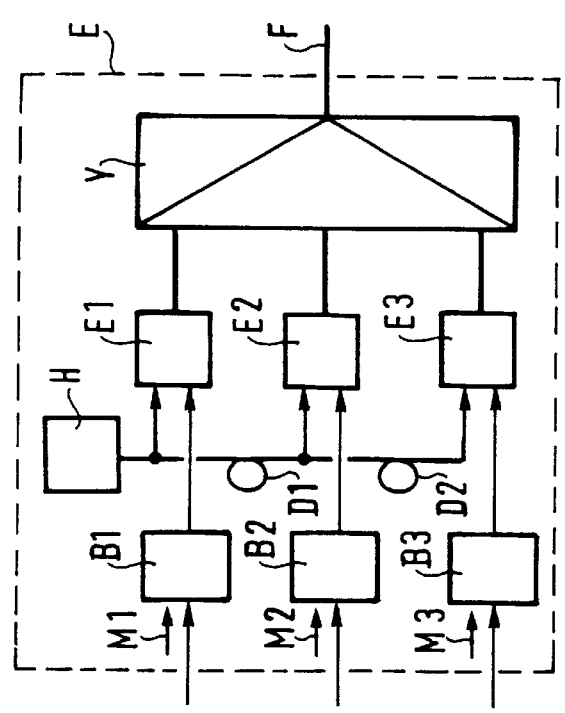
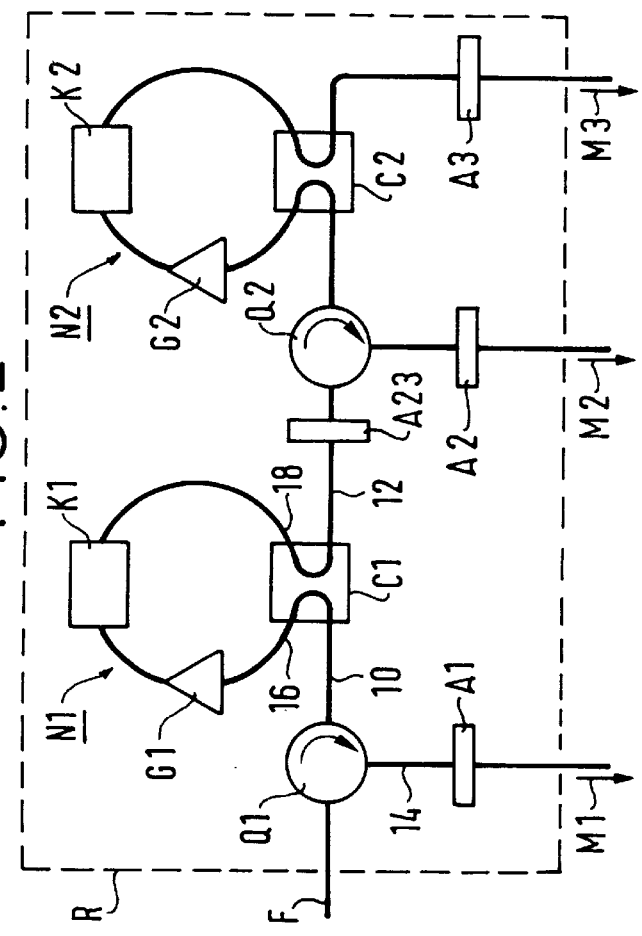

METHOD AND A SYSTEM FOR OPTICAL COMMUNICATIONS WITH PASSIVE ROUTING

FIELD OF THE INVENTION

The present invention relates in particular to a communications system. Usually, such a system connects subscribers situated at considerable distances from one another to enable them to interchange messages. That is why the system uses a common medium for conveying a plurality of messages coming from a plurality of senders and/or intended for a plurality of destinations. Routing means are then necessary to enable each message that is to be conveyed by such a medium to be effectively directed to the medium, and to enable each message that has been conveyed by the medium to be directed to the intended destination. To enable such routing means to perform their function, it is the practice for each message to be provided with an address defining its destination. Active routing means may include decision-making elements that read the address portion only and that control switching means accordingly to direct the entire message. Passive routing means do not include specific decision-making elements, i.e. the address is incorporated in the message in such a manner that the message appears to direct itself within such means.

The present invention relates more particularly to messages which are constituted by successions of pulses of light, and more particularly to the case where the pulses are in the form of solitons so as to be capable of being conveyed without deformation over great distances. Given the ever increasing data rates that it is desired to convey, it is desirable for the routing means to be passive and all-optical, i.e. for the message and its address to remain in optical form within the routing means.

BACKGROUND OF THE INVENTION

Known passive optical routing means use wavelength multiplexing. The destination of a message is then defined by the wavelength of the pulses constituting the message, with the wavelength thus constituting the address of the message. Such passive optical routing means place various troublesome constraints on the implementor of the communications system, e.g. minimum spacing between spectrum channels, amplifiers having adequate gain flatness as a function of wavelength, and reconfigurable emitter assemblies.

OBJECT AND SUMMARY OF THE INVENTION

A particular aim of the present invention is to avoid the constraints imposed by known passive optical routing means. To this end, the invention provides in particular an optical communications method with passive routing, wherein optical pulses carrying information to be conveyed are routed, for each pulse, by the intensity of the pulse.

BRIEF DESCRIPTION OF THE DRAWINGS

An example of how the invention can be implemented is described below with reference to the accompanying diagrammatic figures. When the same element is shown in more than one of the figures it is designated therein by the same reference digits and/or letters. When two elements are designated by the same letter followed by different digits, then both elements are of the same kind and they perform analogous functions.

FIGS. 1 and 2 show respectively an emitter assembly and routing means in the same communications system.

FIG. 3 shows a run of pulses propagating in a common optical waveguide of the system of FIGS. 1 and 2, with optical intensity being plotted up the ordinate and time along the abscissa.

MORE DETAILED DESCRIPTION

As shown in FIGS. 1 and 2, a communications system includes the following elements:

An emitter assembly E for emitting messages destined for a plurality of destinations. Each message is constituted by pulses such as P3-1 (see FIG. 3) and carries both information to be conveyed to one of said destinations and an address for the message designating the destination. These pulses are light pulses.

A common optical medium F for receiving and conveying the messages, at least locally. Typically, the medium conveys the messages over a distance such that it is advantageously constituted by a waveguide such as an optical fiber or a succession of such fibers.

Finally routing means R for receiving the messages conveyed by the medium. These means need to be responsive to the addresses of the messages to send each of them over a route leading to the destination designated by the address of the message.

In accordance with the present invention, the emitter assembly E imparts an intensity level such as I3 to each of the pulses such as P3-1 of each message with the intensity level constituting at least part of the address of the message.

In conventional manner, the pulses carry the information to be conveyed in clocked and binary manner. More precisely, for each message or message portion, the pulses can be present at a given point in the system only at clock instants belonging to a regular succession of such instants, and information is carried by the presence or absence of such a pulse at each of said instants. Nevertheless, the present invention can also be applied in other cases, for example where information is carried by time offsets of pulses on either side of clock instants.

In a simple case, the intensities of the pulses in a message provide full address information for the message. This simple case can be implemented in a communications network or in a fraction of such a network when the number of subscriber destinations does not exceed the number of different intensities that can be distinguished without risk of error by the routing means. In other cases, addresses may be completed by other elements such as a message header or pulse wavelength if the routing means responsive to pulse intensity are preceded by wavelength separation means.

When messages need to be conveyed by a line constituted by optical fibers presenting shifted chromatic dispersion and a Kerr effect, and when said line is of great length, which may be several thousands of kilometers, it is known that the pulses of such messages can be given waveforms, intensities, and half-height widths such that within the fibers they constitute solitons that are capable of propagating without deformation. Conventionally, solitons are all of the same intensity, and the fact that they conserve their waveform makes it possible to increase transmission distance and/or rate.

That is why, in cases where the various messages emitted by the emitter assembly E are subsequently to be conveyed over a common line of great length, which may in particular constitute said common medium, or over various lines of great length of the above kind and presenting analogous characteristics with respect to dispersion and the Kerr effect, the emitter assembly advantageously gives the pulses of the various messages respective half-height widths L1, L2, and L3. These widths match the respective intensities I1, I2, and I3 in such a manner that:

$$Ii \times Li^2 = \text{a constant}$$

where i is an index designating respective digits 1, 2, and 3. The constant, and the waveform of the pulses are such that the pulses constitute solitons when said line(s) is/are of great length. This disposition associates the advantage of waveform conservation that is specific to solitons with the advantage of an address element that is independent of wavelength and that is carried by each pulse.

As shown in FIG. 3, pulses such as P3-1 in each message define clock instants t1-1, . . . , t3-2 for the pulses. At least one of the messages constitutes a message that is subdivided, and at least two clock instants t1-1, t1-2 of the pulses in each subdivided message are separated from each other by at least one clock instant t2-1 of pulses in another message.

Preferably, the emitter assembly E performs time multiplexing over successive bit periods (T1, T2) for a plurality of multiplexed channels respectively conveying a plurality of said subdivided messages. These channels have intensities (I1, . . . , I3) and clock instants (t1-1, . . . , t3-2) respectively constituting the pulse intensities and the clock instants of said messages. Each of the bit periods includes a clock instant of each of the multiplexed channels. This interleaved disposition prevents a pulse being conveyed adjacent to another pulse having the same intensity. At least when the pulses are solitons, this disposition thus limits interference interaction effects that can arise between pulses that are too close together. It thus enables pulses to be moved closer together in order to increase transmission rate. Nevertheless, it can sometimes be simpler to transmit each message in the form of sequences, each of which comprises a plurality of pulses belonging to that message only, with two sequences of a message being separated by at least one sequence belonging to another message.

As shown in FIG. 1, the emitter assembly E comprises, for example, the following elements:

Buffer memories B1, B2, and B3, each of which is associated with a respective channel to receive and conserve the messages that are to be emitted over the channel.

Emitters E1, E2, and E3. Each emitter is associated with a channel and is controlled by the corresponding buffer memory. It emits message pulses each having the same system wavelength and intensity corresponding to its own channel, i.e. respectively I1, I2, and I3. The pulses carry messages that have been received by the associated buffer memories.

A clock H synchronizing each emitter to cause it to emit message pulses at the clock instants of the channel associated with the emitter. By way of example, the clock provides a clock pulse at the beginning of each bit period to synchronize emitter El, and this clock pulse travels along delay lines such as D1 and D2 for the purpose of synchronizing the emitters E2 and E3.

Finally, a multiplexer Y injects all of the message pulses into an optical fiber line F constituting the said common medium.

As shown in FIG. 2, the routing assembly R comprises the following elements, for example:

An intensity separator N1 having a separation threshold and including a bidirectional waveguide 10 and an outlet waveguide 12. The separator receives each message pulse over the bidirectional waveguide. Either it conveys the pulse to its own outlet, or else it reflects it back into the bidirectional waveguide in the reverse direction, depending on whether the intensity of the pulse is one side or the other of the separation threshold.

Finally, a direction separator Q1 disposed in series in the bidirectional waveguide 10 and having a reflection outlet waveguide 14 such that the separator allows pulses propagating in the forward direction to enter the bidirectional waveguide 10 while it directs pulses reflected by the intensity separator to the reflection outlet waveguide 14. The direction separator may be constituted by an optical circulator which, in comparison with another possible type of separator constituted by a sloping semi-transparent separator plate, avoids the drawbacks of losing power.

Preferably, each routing member of FIG. 2 also includes a respective saturatable absorber A1, A23 on its reflection outlet waveguide 14 and on its onward transmission outlet 12. In the event of imperfect selectivity in the intensity separator, such an absorber when appropriately adjusted serves to absorb completely any interfering residual pulses that the separator may have directed to the wrong outlet waveguide. This restricts crosstalk.

Each intensity separator is advantageously constituted by a non-linear amplified loop mirror such as N1 including a 50/50 type inlet coupler such as C1. The coupler C1 has first and second internal waveguides 16 and 18 respectively in series with the bidirectional waveguide 10 and with the forwarding outlet 12. Each such separator also includes a series-connected group comprising an amplifier G1 and a non-linear medium K1 having propagation time that depends on intensity. This group is connected between the first and second internal waveguides. The structure of an optical intensity separator using such a mirror is described, in particular, in an article published in Optics Letters, Vol. 15, No. 13, July 1990, entitled "Nonlinear amplifying mirror", by M. E. Fermann, F. Haberl, M. Hofer, and H. Hochreiter, at pages 752 to 754. Another type of intensity separator can be constituted by a Mach-Zehnder type interferometer which has the sometimes important advantage of being suitable for integration on a semiconductor substrate. Another type of separator may be constituted by a non-linear Bragg grating integrated in the optical fiber.

In FIG. 3, the intensities of the channels associated with the emitters E1, E2, and E3 are respectively those referenced I1, I2, and I3. They form an increasing run in that order. The gain of the amplifier G1 and the non-linear medium K1 are selected, for example, in such a manner that a first intensity separator N1 reflects only pulses of intensity below a threshold lying between the intensities I1 and I2. In addition, the gain saturates above intensity I2. A second intensity separator N2 of the same type then has a separation threshold lying between the intensities I2 and I3.

By way of a numerical example of a system implementing the invention and using solitons, it can be specified that the bit period may be 100 ps, the intensity ratio between channels may be equal to 2 (I1/I2=I2/I3, etc. . . . =½), the number of channels may be 4, the half-height width of the shortest pulses may be about L4=5 ps, these shortest pulses having the greatest intensity I4, and a half-height width of the longest pulses of the order of $L1=\sqrt{8} \times 5=14$ ps, said longest pulses having the smallest intensity I1=I4/8.

We claim:

1. An optical communications method with passive routing, wherein optical pulses carrying information to be conveyed are routed, for each pulse, by the intensity of the pulse and wherein pulses having intensities above a predetermined intensity are routed to a first destination via a first waveguide and pulses having intensities below said predetermined intensity are routed to a second destination via a second waveguide different from said first waveguide.

2. An optical communications system having passive routing, and comprising:

an emitter assembly for emitting messages for a plurality of destinations, each of said messages being constituted by pulses of said message and carrying both information to be transmitted to one of said destinations and an address for the message designating the destination, said pulses being optical;

a common optical medium for receiving and conveying said messages; and routing means for receiving the messages conveyed by said optical medium, said routing means being responsive to said addresses to direct each of said conveyed messages to that one of said destinations that is designated by the address of the message;

wherein said emitter assembly gives each of said pulses of each of said messages an intensity level constituting at least a portion of said address of said message.

3. A system according to claim 2, wherein said emitter assembly gives said pulses half-heights matching their respective intensities so that said pulses can constitute solitons in at least one optical transmission line.

4. A system according to claim 2, in which said pulses of each of said messages define clock instants of said pulses, at least one of said messages constituting a subdivided message, at least two clock instants of pulses of each of said subdivided messages being separated from each other by at least one clock instant of pulses of another one of said messages.

5. A system according to claim 4, in which said emitter assembly performing time multiplexing of a plurality of multiplexed channels on successive bit periods, said channels respectively transmitting a plurality of said subdivided messages, said channels having respective intensities and clock instants constituting respective pulse intensities and clock instants of said messages, each of said bit periods including a clock instant of each of said multiplexed channels.

6. A system according to claim 5, said emitter assembly including for each of said channels:

a buffer memory associated with said channel to receive and store temporarily said messages for emitting over said channel; and an emitter associated with said channel and controlled by said buffer memory to emit said message pulses at a wavelength of said system and at said intensity of the channel, and carrying said messages as received and temporarily stored by said buffer memory, said emitter assembly further including:

a clock synchronizing each of said emitters to cause it to emit said message pulses at said clock instants of the channel associated with said emitter; and a multiplexer injecting all of said message pulses into said common optical medium.

7. A system according to claim 2, said routing means comprising at least a routing member, itself comprising:

an intensity separator having a separation threshold and including a bidirectional waveguide and a forwarding outlet waveguide, said separator receiving each of said message pulses via said bidirectional waveguide and either forwarding it towards said forwarding outlet waveguide or else reflecting it in the opposite direction to the forward direction back into said bidirectional waveguide, depending on whether the intensity of the pulse lies on one side or the other of said separation threshold; and a direction separator disposed in series with said bidirectional waveguide and having a reflection outlet waveguide for passing said message pulses travelling in said forward direction into said bidirectional waveguide and for directing to said reflection outlet waveguide said message pulses that are reflected by said intensity separator.

8. A system according to claim 7, said routing member further including a saturatable absorber on at least one of said reflection outlet waveguide and said forwarding outlet waveguide.

9. A system according to claim 7, said intensity separator being a non-linear amplified loop mirror comprising:

a 50/50 type inlet coupler having first and second internal waveguides respectively in continuity with said bidirectional waveguide and with said forwarding outlet waveguide; and a series-connected group constituted by an amplifier and by a non-linear medium having propagation time that depends on intensity, said group being connected between first and second internal waveguides.

10. A system according to claim 7, in which said routing means include a plurality of said routing members connected in series and having staged intensity thresholds.

11. An optical communications method with passive routing, comprising the following steps:

emitting messages for a plurality of destinations, each of said messages being constituted by pulses of said message and carrying both information to be transmitted to one of said destinations and an address for the message designating the designation, said pulses being optical;

receiving and conveying said message in a common optical medium; and receiving the messages conveyed by said optical medium in response to said addresses to direct each of said conveyed messages to that one of said destination that is designated by the address of the message, wherein each of said pulses of each of said messages has an intensity level constituting at least a portion of said address of said message.

* * * * *